(12) United States Patent
Shirai et al.

(10) Patent No.: US 9,950,459 B2
(45) Date of Patent: Apr. 24, 2018

(54) VEHICLE RESIN PART AND VEHICLE RESIN PART MANUFACTURING METHOD

(71) Applicant: NHK SPRING CO., LTD., Yokohama-shi (JP)

(72) Inventors: Jun Shirai, Yokohama (JP); Taisuke Matsuzaki, Yokohama (JP); Yuta Takagi, Yokohama (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 257 days.

(21) Appl. No.: 14/712,819

(22) Filed: May 14, 2015

(65) Prior Publication Data

US 2015/0329082 A1   Nov. 19, 2015

(30) Foreign Application Priority Data

May 19, 2014   (JP) ................. 2014-103514

(51) Int. Cl.
| | |
|---|---|
| *B60R 99/00* | (2009.01) |
| *B29C 45/40* | (2006.01) |
| *B60N 2/07* | (2006.01) |
| *B29C 45/44* | (2006.01) |

(52) U.S. Cl.
CPC .......... *B29C 45/40* (2013.01); *B29C 45/4435* (2013.01); *B60N 2/0725* (2013.01); *B60R 99/00* (2013.01); *Y10T 428/24479* (2015.01)

(58) Field of Classification Search
CPC .............................................. Y10T 428/24479
USPC ......................................................... 428/119
See application file for complete search history.

(56) References Cited

U.S. PATENT DOCUMENTS 3,762,559 A * 10/1973 Knoy ..................... B01D 24/12
                                                                210/293

FOREIGN PATENT DOCUMENTS

JP          2013-203217 A     10/2013

* cited by examiner

*Primary Examiner* — Brent T O'Hern
(74) *Attorney, Agent, or Firm* — Knobbe, Martens, Olson & Bear, LLP (57) ABSTRACT

To provide a vehicle resin part and a vehicle resin part manufacturing method with which raised portions can be formed using slanted slide molds even on opposing molded portions that have a narrow distance between them. In a rail cover, shelf-shaped portions that can be molded using a cavity and a core are formed on opposing side wall portions, and claw portions that can be molded using slanted slide molds are formed projecting from the shelf-shaped portions in the directions of the opposing side wall portions. Additionally, the claw portions are molded by moving, during demolding, the pair of slanted slide molds in the directions of the opposing side wall portions from a molding position and thereafter removing the pair of slanted slide molds in a forward direction.

6 Claims, 7 Drawing Sheets

VEHICLE RESIN PART AND VEHICLE RESIN PART MANUFACTURING METHOD

CROSS-REFERENCE TO RELATED APPLICATION

This application is based on and claims priority under 35 USC 119 from Japanese Patent Application No. 2014-103514 filed on May 19, 2014, which is incorporated by reference herein.

BACKGROUND

Technical Field

The present invention relates to a vehicle resin part applied to a vehicle such as an automobile and a vehicle resin part manufacturing method.

Related Art

Conventionally, as an example of a vehicle resin part applied to a vehicle such as an automobile, there has been the vehicle seat leg cover disclosed in Japanese Patent Application Laid-open (JP-A) No. 2013-203217. The leg cover is equipped with: a rear end engagement piece; a pair of right and left opposing engagement pieces that have a notch interposed between them and are formed in positions sufficiently away from, on the front side of, the rear end engagement piece; and a pair of right and left opposing engagement pieces that are formed in positions adjacent to, and on the front side of, the rear end engagement piece. Furthermore, the opposing engagement pieces are each molded in the shape of a cantilever beam that hangs down from a ceiling portion of the leg cover and has a hook (claw) on its distal end. Additionally, the hooks of the opposing engagement pieces project in directions toward one another, and the hooks engage with engagement holes formed in corresponding positions in a leg bracket.

However, in a case where this kind of vehicle resin part is molded using a forming mold, slanted slide molds become necessary in order to mold the hooks (raised portions) on the opposing engagement pieces (molded portions). For this reason, in addition to the undercut amounts (raised amounts) of the raised portions, it is necessary to ensure space for moving the slanted slide molds in the undercut direction to remove the slanted slide molds from between the opposing molded portions. As a result, in a case where the distance between the opposing molded portions forming the raised portions is narrow, it becomes difficult to form the raised portions on the opposing molded portions using the slanted slide molds.

SUMMARY OF THE INVENTION

In consideration of the circumstances described above, it is a problem of the present invention to provide a vehicle resin part and a vehicle resin part manufacturing method with which raised portions can be formed using slanted slide molds even on opposing molded portions that have a narrow distance between them.

A vehicle resin part pertaining to a first aspect of the present invention comprises: a base portion that is formed on at least one of opposing molded portions and can be molded using a cavity and a core; and a raised portion that is formed projecting from the base portion in the direction of the other of the opposing molded portions and can be molded using a slanted slide mold.

In the vehicle resin part pertaining to the first aspect of the present invention, the base portion that can be molded using a cavity and a core is formed on at least one of the opposing molded portions. Additionally, the raised portion that can be molded using a slanted slide mold is formed projecting from the base portion in the direction of the other of the opposing molded portions. For this reason, the undercut amount decreases by the amount that the raised portion is elevated by the base portion, and compared to the amount that the slanted slide mold must be moved in the direction of the other of the opposing molded portions during demolding in the case of molding a raised portion that does not have a base portion, the amount that the slanted slide mold must be moved in the direction of the other of the opposing molded portions during demolding can be reduced. As a result, raised portions can be formed using slanted slide molds even on opposing molded portions that have a narrow distance between them.

A vehicle resin part pertaining to a second aspect is the vehicle resin part pertaining to the first aspect, wherein the base portion is a shelf-shaped portion equipped with a pair of shelf leg portions disposed projecting from the molded portion and a shelf plate portion disposed bridging the pair of shelf leg portions.

In the vehicle resin part pertaining to the second aspect, the base portion is a shelf-shaped portion equipped with a pair of shelf leg portions disposed projecting from the molded portion and a shelf plate portion disposed bridging the pair of shelf leg portions, so the weight of the base portion can be reduced.

A vehicle resin part pertaining to a third aspect is the vehicle resin part pertaining to the first aspect or the second aspect, wherein the raised portion is an engagement portion that engages with a seat member.

In the vehicle resin part pertaining to the third aspect, engagement portions that engage with a seat member can be formed using slanted slide molds even on molded portions that have a narrow distance between them.

A vehicle resin part manufacturing method pertaining to a fourth aspect comprises the steps of: molding, using a cavity and a core, a base portion formed on at least one of opposing molded portions; and molding a raised portion formed projecting from the base portion in the direction of the other of the opposing molded portions by moving, during demolding, a slanted slide mold in the direction of the other of the opposing molded portions and removing the slanted slide mold in a direction along the molded portions.

In the vehicle resin part manufacturing method pertaining to the fourth aspect, the base portion is molded using a cavity and a core on at least one of the opposing molded portions. Additionally, the raised portion formed projecting from the base portion in the direction of the other of the opposing molded portions is molded by moving, during demolding, a slanted slide mold in the direction of the other of the opposing molded portions and removing the slanted slide mold in a direction along the molded portions. For this reason, the undercut amount decreases by the amount that the raised portion is elevated by the base portion, and compared to the amount that the slanted slide mold must be moved in the direction of the other of the opposing molded portions during demolding in the case of molding a raised portion that does not have a base portion, the amount that the slanted slide mold must be moved in the direction of the other of the opposing molded portions during demolding can be reduced. As a result, raised portions can be formed using slanted slide molds even on opposing molded portions that have a narrow distance between them.

As described above, in the vehicle resin part and the vehicle resin part manufacturing method pertaining to the present invention, raised portions can be formed using slanted slide molds even on opposing molded portions that have a narrow distance between them.

DETAILED DESCRIPTION OF THE INVENTION

A vehicle resin part and a vehicle resin part manufacturing method pertaining to an embodiment of the present invention will be described below using FIG. 1 to FIG. 7. It will be noted that the vehicle resin part of the present embodiment is applied to a vehicle seat of an automobile and that arrow FR appropriately shown in the drawings indicates a forward direction of the vehicle seat, arrow UP indicates an upward direction of the vehicle seat, and arrow IN represents an inward direction in the width direction of the vehicle seat.

Figure 6:
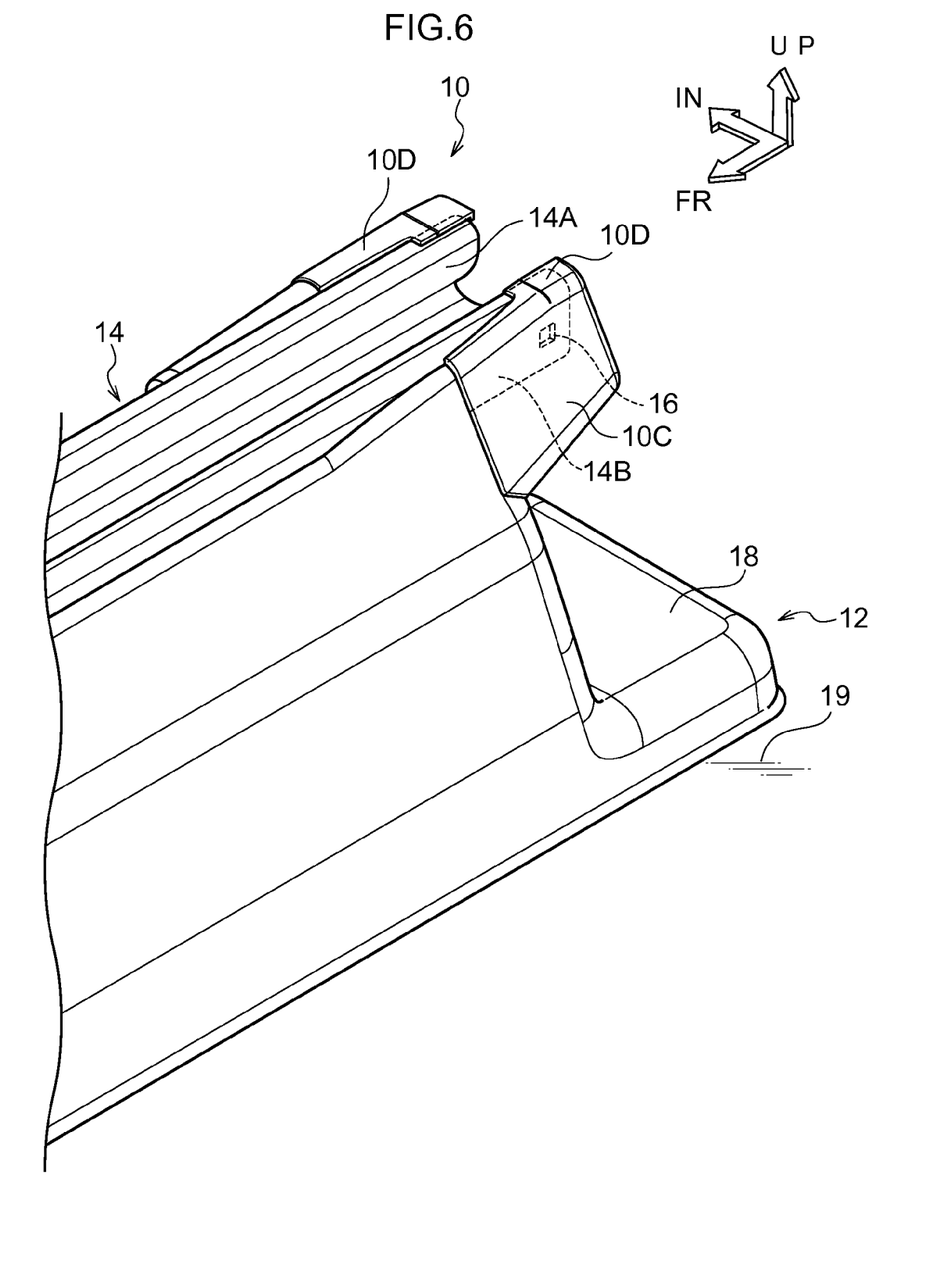
FIG. 6 is a perspective view showing an assembled state of the vehicle resin part pertaining to the embodiment of the present invention as seen obliquely from the front.

As shown in FIG. 6, a rail cover 10 serving as the vehicle resin part of the present embodiment is a vehicle seat resin part and is molded from a synthetic resin. Furthermore, the rail cover 10 is attached from the rear side to a slide rail lower member 14, which is part of a seat slide rail serving as a seat member configuring a seat slide device 12, and covers the outer peripheral portion of a rear end portion 14A of the slide rail lower member 14.

Figure 7:
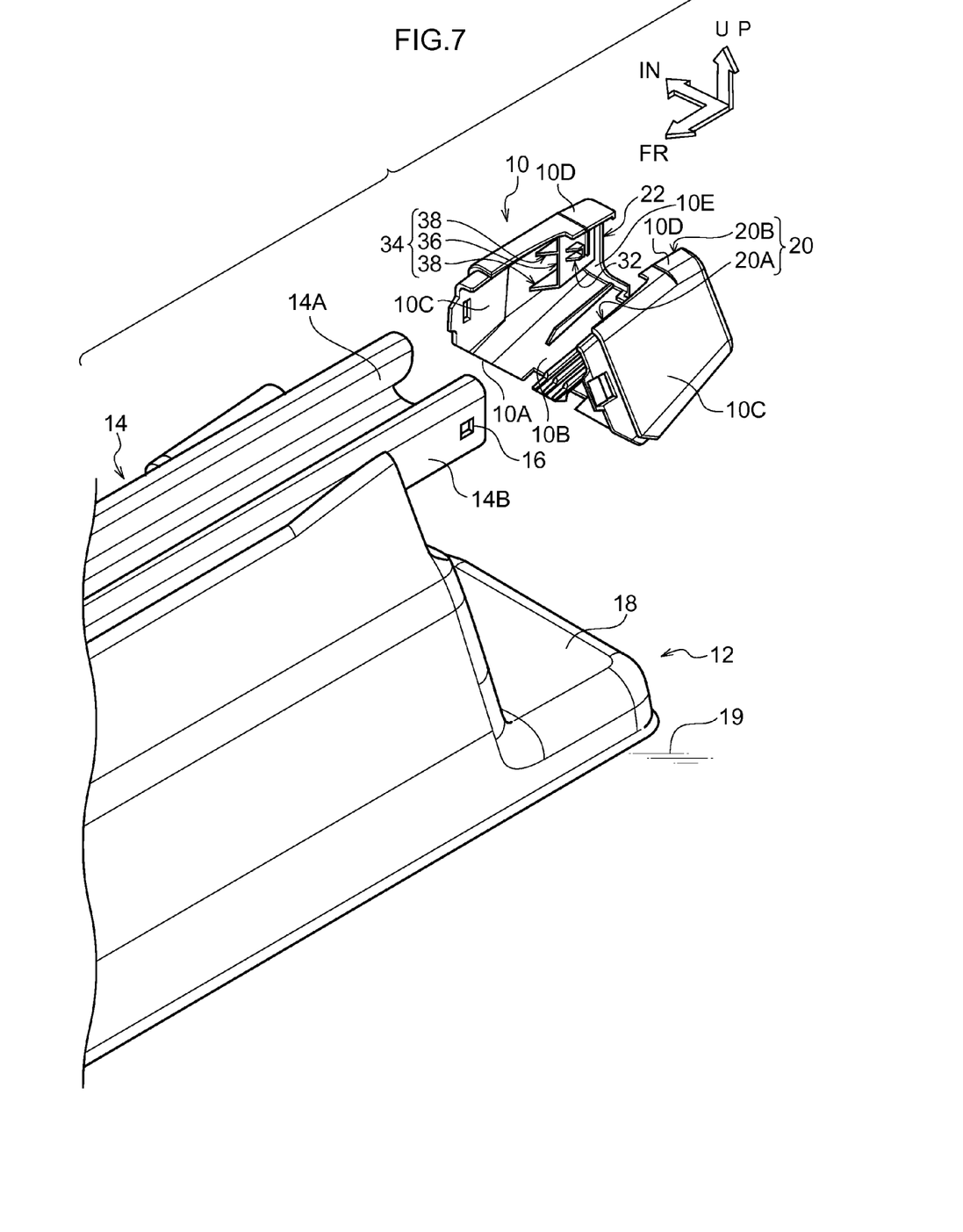
FIG. 7 is an exploded perspective view of FIG. 6.

As shown in FIG. 7, rectangular engagement holes 16 are formed in opposing positions in right and left side wall portions 14B of the rear end portion 14A of the slide rail lower member 14. It will be noted that FIG. 7 shows only one of the engagement holes 16.

The rail cover 10 attaches to the rear end portion 14A of the slide rail lower member 14 from the rear side of the slide rail lower member 14 and is thereby held on the rear end portion 14A of the slide rail lower member 14. It will be noted that reference sign 18 in FIG. 6 and FIG. 7 denotes a leg cover, and the leg cover 18 covers a non-illustrated leg bracket disposed on a portion of the seat slide device 12 fixed to a vehicle body floor 19.

Figure 1:
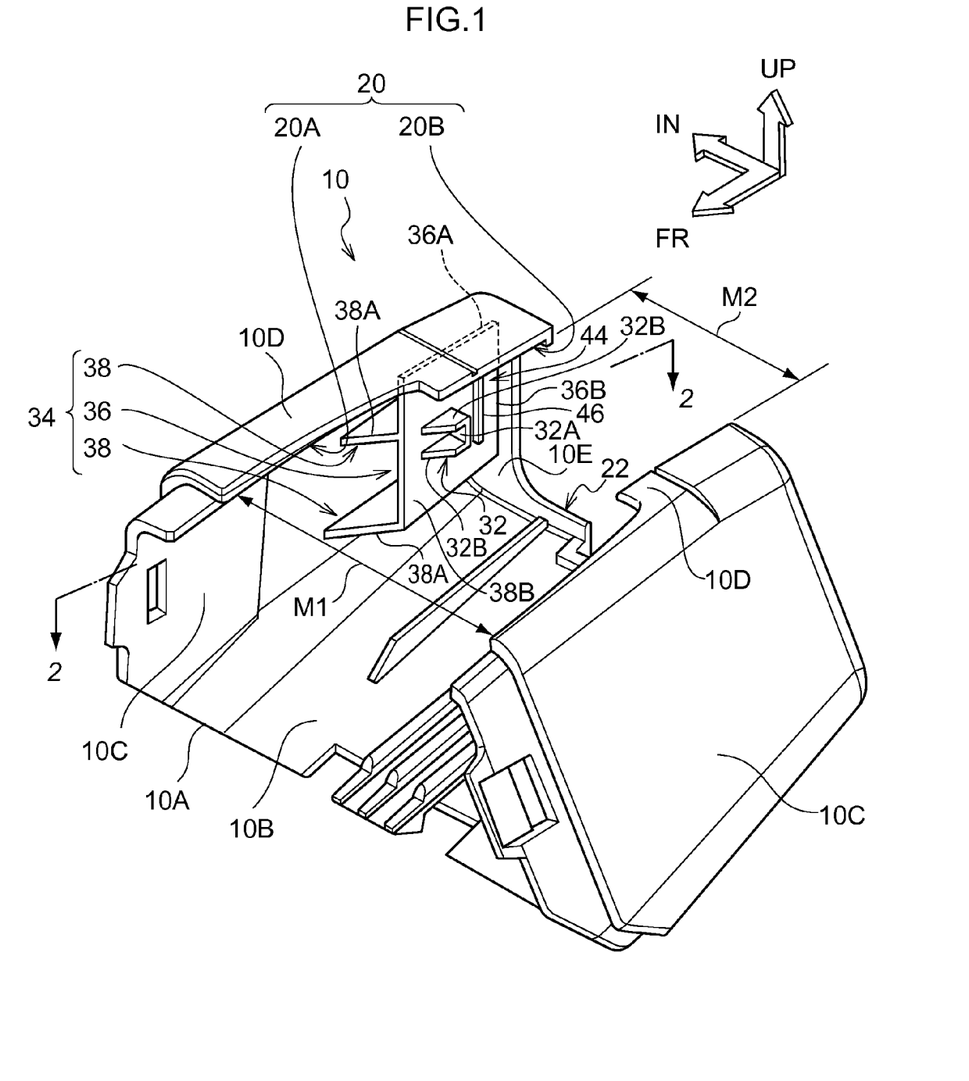
FIG. 1 is a perspective view showing a vehicle resin part pertaining to an embodiment of the present invention as seen obliquely from the front.

As shown in FIG. 1, a front end 10A of the rail cover 10 is open. Furthermore, side wall portions 10C serving as opposing molded portions are formed heading upward on both width direction (right and left direction) ends of a lower wall portion 10B of the rail cover 10. Furthermore, upper wall portions 10D bent inward in the width direction of the rail cover 10 are formed on the upper ends of the opposing side wall portions 10C. The directions in which the upper wall portions 10D are bent are directions toward one another. The space between the opposing pair of upper wall portions 10D is an open portion 20.

The open portion 20 in the upper portion of the rail cover 10 has a front portion 20A and a rear portion 20B. An open width M1 of the front portion 20A is wider than an open width M2 of the rear portion 20B (M1>M2). Furthermore, a frame-shaped rear wall portion 10E is formed on the inner peripheral side of the rear end of the rail cover 10 along the lower wall portion 10B, the pair of side wall portions 10C, and the pair of upper wall portions 10D. The inner peripheral side of the rear wall portion 10E is an open portion 22.

Figure 3:
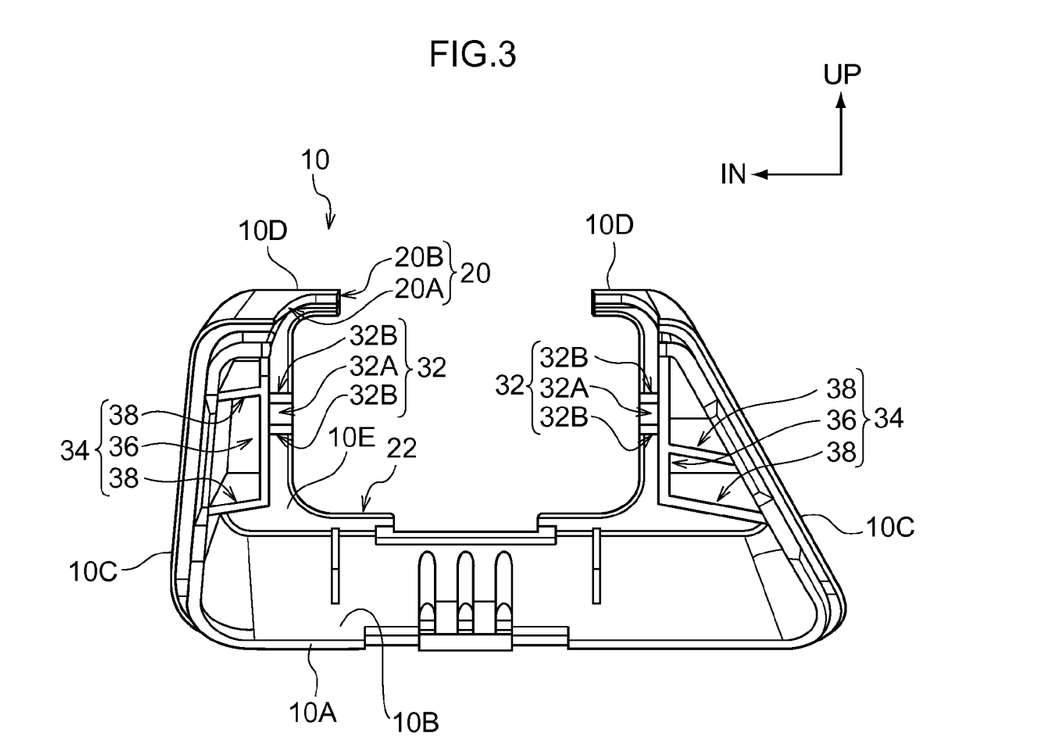
FIG. 3 is a front view showing the vehicle resin part pertaining to the embodiment of the present invention as seen from the front.

As shown in FIG. 3, the side wall portion 10C on the seat width direction outside of the rail cover 10 slants in a direction toward the side wall portion 10C on the inside while heading upward. Furthermore, claw portions 32 serving as raised portions are formed projecting on the inside surfaces (opposing surfaces) of the rear portions of the side wall portions 10C. The claw portions 32 are formed on shelf-shaped portions 34 serving as base portions that become bases, and the claw portions 32 engage with the engagement holes 16 in the slide rail lower member 14 shown in FIG. 7.

Figure 2:
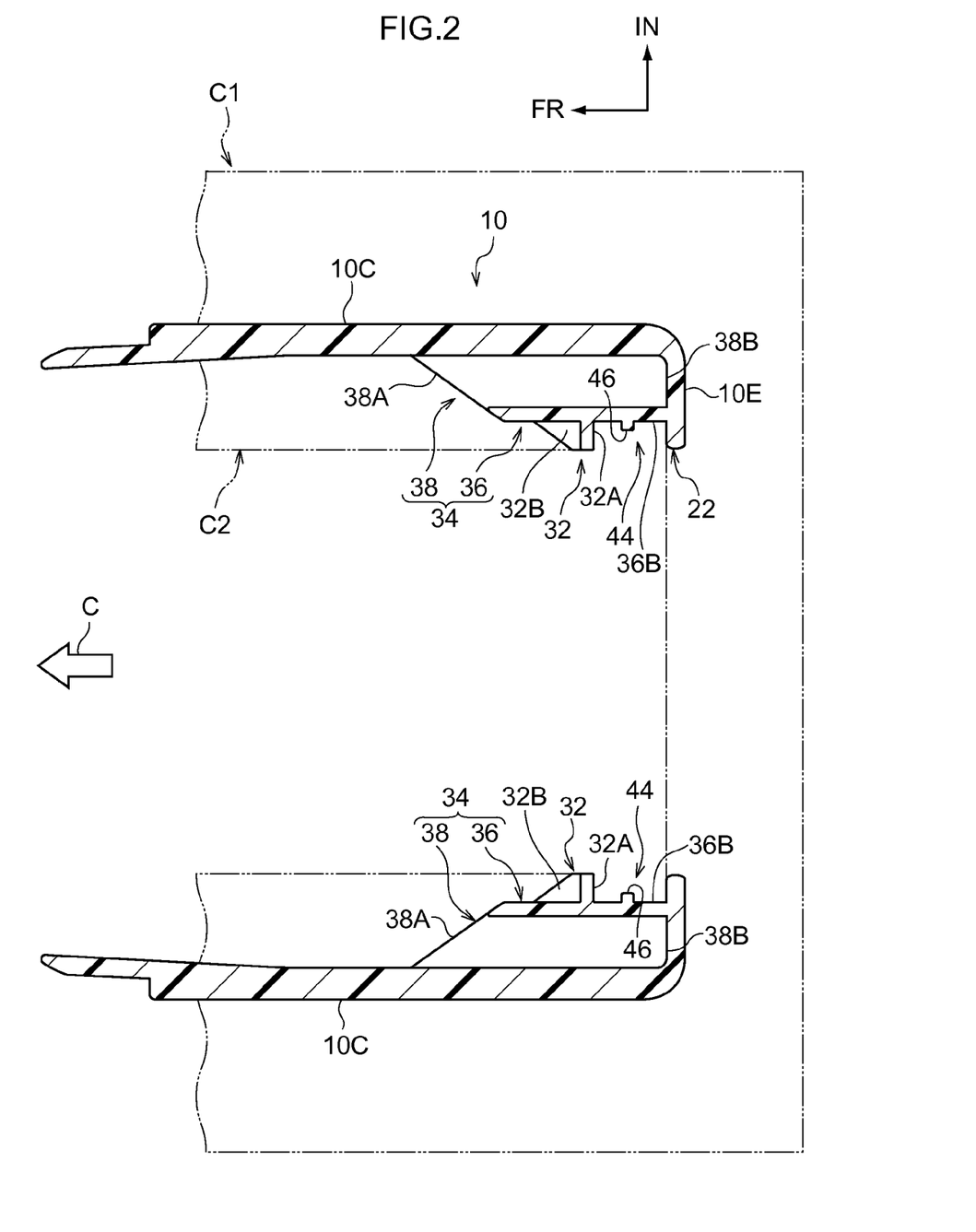
FIG. 2 is an enlarged cross-sectional view along cross-sectional line 2-2 of FIG. 1.

As shown in FIG. 1 and FIG. 2, the shelf-shaped portions 34 of the rail cover 10 are each equipped with a pair of upper and lower shelf leg portions 38, which are disposed projecting from the side wall portion 10C, and a flat plate-shaped shelf plate portion 36, which is disposed bridging the shelf leg portions 38. The pair of upper and lower shelf leg portions 38 couple the upper portion and the lower portion of the shelf plate portion 38 to the side wall portion 10C of the rail cover 10. Furthermore, the shelf plate portion 36 has a rectangular shape as seen in a side view (as seen from the direction of the side wall portion 10C). The shelf plate portion 36 is disposed parallel to the side wall portion 10C of the rail cover 10 in a position spaced apart from the side wall portion 10C. The pair of upper and lower shelf leg portions 38 are formed between the side wall portion 10C and the shelf plate portion 36. It will be noted that FIG. 1 shows one of the opposing claw portions 32 and one of the opposing shelf-shaped portions 34.

As shown in FIG. 1, the shelf plate portion 36 of the shelf-shaped portion 34 is disposed extending upward beyond the upper shelf leg portion 38. An upper end edge portion 36A of the shelf plate portion 36 is coupled to the upper wall portion 10D of the rail cover 10. Furthermore, a rear end edge portion 36B of the shelf plate portion 36 is coupled to the rear wall portion 10E of the rail cover 10. It will be noted that front end edge portions 38A of the upper and lower shelf leg portions 38 slant from the shelf plate portion 36 in the forward direction toward the upper wall portion 10D on the outside.

The shelf-shaped portions 34 of the rail cover 10 are molded using a cavity C1 and a core C2 indicated by the long dashed double-short dashed lines in FIG. 2. More specifically, the shelf-shaped portions 34 are molded by a step of removing, during demolding, the core C2 from the molding position shown in FIG. 2 in the forward direction (the direction of arrow C in FIG. 2), which is a direction along the side wall portions 10C of the rail cover 10.

As shown in FIG. 1, the opposing claw portions 32 are formed projecting on the shelf plate portions 36. Furthermore, the claw portions 32 are each configured by a rear wall portion 32A, which is disposed standing perpendicular from the shelf plate portion 36, and a pair of upper and lower side wall portions 32B. The rear wall portion 32A is disposed standing parallel to the rear wall portion 10E of the rail cover 10, and the pair of upper and lower side wall portions 32B are disposed extending in the forward direction from both the upper and lower ends of the rear wall portion 32A. Furthermore, the shape of each of the pair of upper and lower side wall portions 32B as seen from the up and down direction is trapezoidal, and the front end edge portions of each of the pair of upper and lower side wall portions 32B slant from the distal end of the rear wall portion 32A in the forward direction toward the shelf plate portion 36 on the outside.

Consequently, by attaching the rail cover 10 to the rear end portion 14A of the slide rail lower member 14 from the rear side of the slide rail lower member 14, the opposing side wall portions 10C are pushed apart, due to elastic deformation, by the pairs of upper and lower side wall portions 32B of the claw portions 32. Thereafter, when the rail cover 10 is pushed further onto the slide rail lower member 14, the claw portions 32 engage with the engagement holes 16 in the slide rail lower member 14, and the opposing side wall portions 10C return to their original positions.

As shown in FIG. 2, the regions between the rear wall portions 32A of the opposing claw portions 32 and the rear wall portion 10E of the rail cover 10 are recessed portions (undercut portions) 44 that are open in the directions in which they oppose one another. That is, the recessed portions 44 are formed between the rear wall portions 32A of the claw portions 32 and the rear wall portion 10E of the rail cover 10. Furthermore, raised portions 46 are formed projecting on the portions of the shelf plate portions 36 between the rear wall portions 32A of the claw portions 32 and the rear wall portion 10E of the rail cover 10, and the raised portions 46 are parallel to the rear wall portions 32A of the claw portions 32. It will be noted that the raised portions 46 project to a lesser extent than the claw portions 32.

Figure 4:
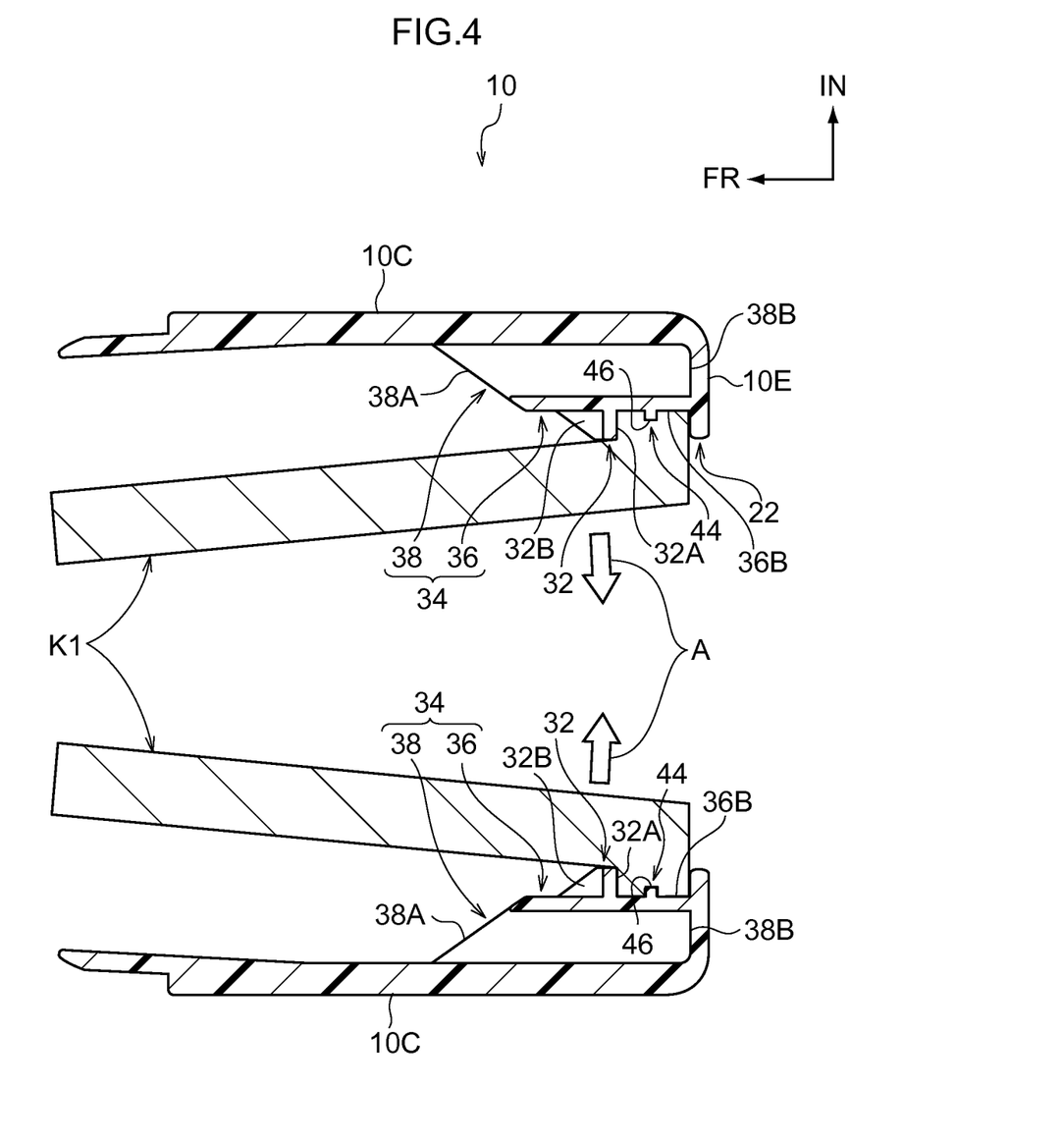
FIG. 4 is a cross-sectional view corresponding to FIG. 2 showing a state before demolding of slanted slide molds in a method of manufacturing the vehicle resin part pertaining to the embodiment of the present invention.
Figure 5:
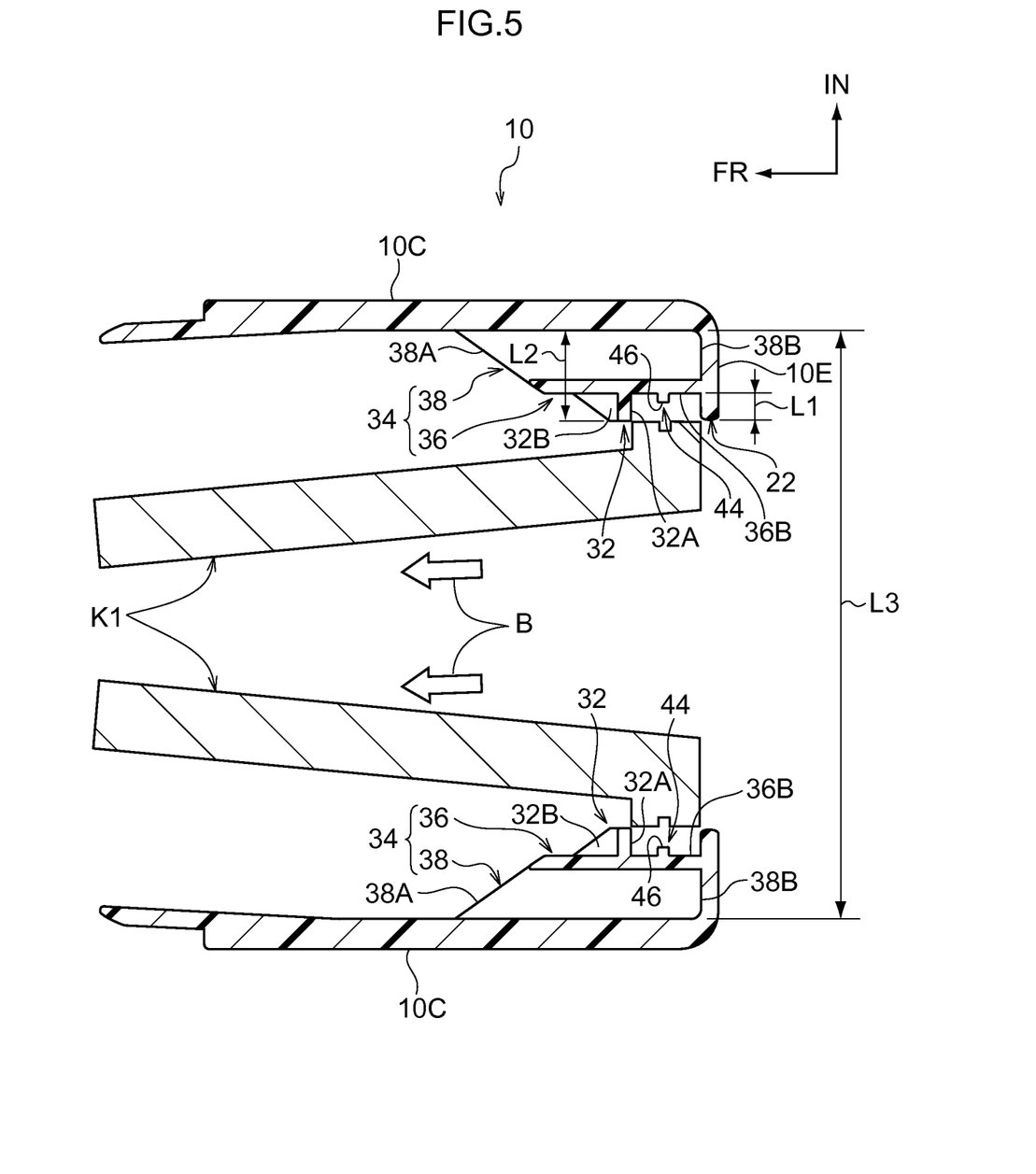
FIG. 5 is a cross-sectional view corresponding to FIG. 2 showing a state during demolding of the slanted slide molds in the method of manufacturing the vehicle resin part pertaining to the embodiment of the present invention.

Consequently, the recessed portions 44 (the claw portions 32) are formed by the steps of: moving, during demolding, a pair of slanted slide molds K1 from the molding position shown in FIG. 4 in the directions of the opposing side wall portions 10C (the directions of arrows A in FIG. 4) to the demolding positions shown in FIG. 5; and thereafter removing the pair of slanted slide molds K1 in the forward direction (the direction of arrows B in FIG. 5), which is a direction along the side wall portions 10C of the rail cover 10. It will be noted that the overall shape of each of the claw portions 32 as seen in a side view is a rectangular shape whose front side is open, and the regions surrounded by the rear wall portions 32A and the pair of upper and lower side wall portions 32B are molded by removing, during demolding, the core C2 from the molding position shown in FIG. 2 in the forward direction (the direction of arrow C in FIG. 2), which is a direction along the side wall portions 10C of the rail cover 10.

(Action and Effects)

Next, the action and effects of the present embodiment will be described.

In the rail cover 10 of the present embodiment, the shelf-shaped portions 34 that can be molded using the cavity C1 and the core C2 are formed on the opposing side wall portions 10C, and the claw portions 32 that can be molded using the pair of slanted slide molds K1 are formed projecting from the shelf-shaped portions 34 in the directions of the opposing side wall portions 10C. Additionally, the claw portions 32 are molded by moving, during demolding, the pair of slanted slide molds K1 from the molding position shown in FIG. 4 in the directions of the opposing side wall portions 10C (the directions of arrows A in FIG. 4) and thereafter removing the pair of slanted slide molds K1 in the forward direction (the direction of arrows B in FIG. 5).

Consequently, compared to a case where claw portions that do not have shelf-shaped portions are formed on the rail cover 10, the undercut amount of the recessed portions (undercut portions) 44 decreases by the amount that the claw portions are elevated by the shelf-shaped portions 34. That is, in a case where claw portions that do not have shelf-shaped portions are formed on the rail cover 10, the recessed portions (undercut portions) 44 that are open in the directions in which they oppose one another reach the side wall portions 10C, and the recessed portions (undercut portions) 44 become deeper (the undercut amount is large). For this reason, as shown in FIG. 5, compared to an amount L2 that each of the slanted slide molds K1 must be moved in the directions of the opposing side wall portions 10C (the directions of arrows A in FIG. 4) during demolding in the case of forming claw portions that do not have shelf-shaped portions on the rail cover 10, an amount L1 (L2>L1) that each of the slanted slide molds K1 must be moved in the directions of the opposing side wall portions 10C (the directions of arrows A in FIG. 4) during demolding in the present embodiment can be reduced. As a result, in the present embodiment, the claw portions 32 that engage with the engagement holes 16 in the slide rail lower member 14 can be formed using the pair of slanted slide molds K1 even in a case where a distance L3 between the opposing side wall portions 10C of the rail cover 10 is narrow.

Furthermore, in the rail cover 10 of the present embodiment, the length (L1 in FIG. 5) of each of the pair of slanted slide molds K1 in the directions of the side wall portions 10C (the directions of arrows A in FIG. 4) can be shortened, so it becomes possible to downsize the pair of slanted slide molds K1.

Furthermore, in the rail cover 10 of the present embodiment, the base portions are the shelf-shaped portions 34. For this reason, the weight of the base portions can be reduced compared to a configuration where the regions between the shelf plate portions 36, the pairs of upper and lower shelf leg portions 38, and the side wall portions 10C of the rail cover 10 are filled with resin. As a result, the weight of the rail cover 10 can be reduced.

(Supplementary Description of the Embodiment)

The present invention has been described in detail above in regard to a specific embodiment, but the present invention is not limited to this embodiment. It will be apparent to persons skilled in the art that a variety of other embodiments are possible in the scope of the present invention. For example, in the rail cover 10 of the embodiment, the shelf-shaped portions 34 serve as the base portions, but instead of the shelf-shaped portions 34, the base portions may also have a trapezoidal shape or another shape in which the regions surrounded by the shelf plate portions 36, the pairs of upper and lower shelf leg portions 38, and the side wall portions 10C of the rail cover 10 are filled with resin.

Furthermore, in the rail cover 10 of the embodiment, the claw portions 32 serving as the raised portions are formed, but instead of the claw portions 32, other raised portions may also be formed on the shelf-shaped portions 34. Furthermore, the shelf-shaped portions 34 are also not limited to the shape in the embodiment and may also have another shelf shape.

Furthermore, in the rail cover 10 of the embodiment, the claw portion 32 and the shelf-shaped portion 34 are formed on each of the opposing side wall portions 10C, but the rail cover 10 may also have a configuration where the claw portion 32 and the shelf-shaped portion 34 are formed on only either one of the opposing side wall portions 10C.

Furthermore, the vehicle resin part of the embodiment is not limited to the rail cover 10 and can also be applied to other vehicle resin parts.

What is claimed is:

1. A vehicle resin part comprising:
   a base portion that is formed on at least one of opposing molded portions and is molded using a cavity and a core; and
   a raised portion that is formed projecting from the base portion in the direction of the other of the opposing molded portions, is molded using a slanted slide mold, and is an engagement portion that is configured to engage with a part of a vehicle,
   wherein the vehicle resin part is a rail cover that covers at least a portion of a rail disposed on the vehicle and the opposing molded portions are opposing side wall portions of the rail cover.

2. The vehicle resin part according to claim 1, wherein the base portion comprises a shelf-shaped portion with a pair of shelf leg portions disposed projecting from the molded portion and a shelf plate portion disposed bridging the pair of shelf leg portions.

3. The vehicle resin part according to claim 1, wherein the part of the vehicle is a seat member.

4. The vehicle resin part according to claim 2, wherein the part of the vehicle is a seat member.

5. A method for manufacturing the vehicle resin part according to claim 1 comprising the steps of:
   molding, using the cavity and the core, the base portion formed on the at least one of opposing molded portions; and
   molding the raised portion formed projecting from the base portion in the direction of the other of the opposing molded portions by moving, during demolding, the slanted slide mold in the direction of the other of the opposing molded portions and removing the slanted slide mold in a direction along the molded portions.

6. The vehicle resin part according to claim 1, wherein a recessed portion is formed between a rear wall of the raised portion and a rear wall of the at least one opposing molded portions.

* * * * *